(12) United States Patent
Shibuya et al.

(10) Patent No.: US 9,569,902 B2
(45) Date of Patent: Feb. 14, 2017

(54) PASSENGER COUNTER

(71) Applicant: GIKEN TRASTEM CO., LTD, Kyoto-shi, Kyoto-fu (JP)

(72) Inventors: Satoru Shibuya, Kyoto (JP); Toru Ono, Kyoto (JP); Hitoshi Oiwa, Kyoto (JP); Yukinari Ishibashi, Kyoto (JP); Sojiro Morita, Kyoto (JP)

(73) Assignee: GIKEN TRATEM CO., LTD, Kyoto-shi (JP)

( * ) Notice: Subject to any disclaimer, the term of this patent is extended or adjusted under 35 U.S.C. 154(b) by 203 days.

(21) Appl. No.: 14/267,972

(22) Filed: May 2, 2014

(65) Prior Publication Data

US 2014/0333769 A1 Nov. 13, 2014

(30) Foreign Application Priority Data

May 10, 2013 (JP) .................. 2013-100305

(51) Int. Cl.
*G07C 9/00* (2006.01)
*H04N 7/18* (2006.01)
(Continued)

(52) U.S. Cl.
CPC ............ *G07C 9/00* (2013.01); *B61L 15/0072* (2013.01); *G06K 9/00778* (2013.01); *H04N 7/183* (2013.01)

(58) Field of Classification Search
CPC ...................................... G07C 9/00
See application file for complete search history.

(56) References Cited

U.S. PATENT DOCUMENTS

| 6,600,509 B1 * | 7/2003 | Kent ................ G01B 11/02 348/143 |
| 2005/0001154 A1 * | 1/2005 | Sumitomo ............ G06M 1/101 250/221 |

(Continued)

FOREIGN PATENT DOCUMENTS

| DE | 10 2011 011 930 | 8/2012 |
| EP | 1 100 050 | 5/2001 |

(Continued)

OTHER PUBLICATIONS

Extended European Search Report for European Application No. 14001584.3-1953 mailed Oct. 7, 2014.

*Primary Examiner* — Christopher S Kelley
*Assistant Examiner* — Asmamaw G Tarko
(74) *Attorney, Agent, or Firm* — Amin, Turocy & Watson LLP

(57) ABSTRACT

A passenger counter that counts the number of persons who get on/off a vehicle comprising an imaging unit 2 installed at an inside of a vehicle platform; a setting unit 31 configured to set an inner area I corresponding to a passage inside the vehicle, one outer areas B surrounding the inner area I and inside the vehicle and other outer area A surrounding the inner area I and outside the vehicle; and a count determination unit 35 configured to count the number of persons who move from one outer area A(B) to the other outer area B(A) through the inner area I while a door of the platform is opened, not to count the number of persons while the door is closed, and to perform processing of determining a person existing in the inner area I when the opened (closed) door is closed (opened) to be counted.

6 Claims, 7 Drawing Sheets

(51) Int. Cl.
*B61L 15/00* (2006.01)
*G06K 9/00* (2006.01)

(56) References Cited

U.S. PATENT DOCUMENTS

| | | | |
|---|---|---|---|
| 2008/0212099 A1* | 9/2008 | Chen | G06T 7/20 356/408 |
| 2014/0023233 A1* | 1/2014 | Stefanovic | G06T 7/2033 382/103 |
| 2014/0049647 A1* | 2/2014 | Ick | G06K 9/00771 348/148 |

FOREIGN PATENT DOCUMENTS

| | | |
|---|---|---|
| JP | 2011-242901 | 12/2011 |
| WO | 2012110653 | 8/2012 |

\* cited by examiner

| Title | | Sample Value | | | |
|---|---|---|---|---|---|
| Person ID | | 123 | 124 | 120 | 119 |
| Area position data | Current area position T0 (an area including current position) | A | I | A | B |
| | Most recent area position T1 (an area including a position before the current position) | I | B | I | NO (blank) |
| | Past area position T2 (an area including a position before the most recent position) | B | NO (blank) | A | NO (blank) |

Fig. 4

PASSENGER COUNTER

BACKGROUND OF THE INVENTION

Field of the Invention

The present invention relates to a passenger counter for counting the number of passengers who get in and out of a vehicle, such as a bus, a train, and an elevator.

Description of the Related Art

Conventionally, there is known a passenger discrimination/detection device which is provided in, e.g., a bus so as to discriminate/detect getting-on and getting-off of passengers (Patent Application Publication No. 2011-242901). The passenger discrimination/detection device has a first photoelectronic sensor and a second photoelectronic sensor. The first and second photoelectronic sensors are provided in a getting-on/off passage around an inside of a platform and arranged in the mentioned order from a near side of the platform. The first and second photoelectronic sensors are disposed such that optical paths thereof are both interrupted by passengers passing through the getting-on/off passage. A state where the optical paths of both first and second photoelectronic sensors are not interrupted is referred to as "state 0", a state where the optical path of only the first photoelectronic sensor is interrupted is as "state 1", a state where the optical paths of both first and second photoelectronic sensors are interrupted is as "state 2", and a state where the optical path of only the second photoelectronic sensor is interrupted is as "state 3". When the first and second photoelectronic sensors transit in the order of "state 1", "state 2", "state 3", and "state 0", the passenger discrimination/detection device discriminates that a passenger gets on a vehicle such a bus and adds 1 to the number of getting-on passengers; on the other hand, when the first and second photoelectronic sensors transit in the order of "state 3", "state 2", "state 1", and "state 0", the passenger discrimination/detection device discriminates that a passenger gets off the vehicle and adds 1 to the number of getting-off passengers.

SUMMARY OF THE INVENTION

It can be considered that, in such a conventional passenger discrimination/detection device, when a passenger who moves around the platform in a state where a platform door is closed to disable getting-on/off, he or she is erroneously counted. Further, it can be considered that when a passenger who gets on the bus at a bus stop and stays around the platform or has no choice but to stay around the platform due to congestion, the first and second photoelectronic sensors do not transit according to the prescribed order, with the result that he or she is not counted. Thus, the number of passengers cannot be counted accurately for each location, such as a station, at which the passengers get on and off the vehicle.

The present invention has been made in view of the above situation, and an object thereof is to provide a passenger counter capable of accurately counting the number of passengers.

There is provided according to the present invention a passenger counter that counts the number of persons who get on/off a vehicle by using an imaging unit installed at an inside of the vehicle, capturing a platform of the vehicle from the upper portion, and recognizing/tracking a person appearing on the captured image. The passenger counter includes: a setting unit configured to set, on the captured image, an inner area which is an area corresponding to a passage inside the vehicle including the platform, and at least two outer areas, one of which is an area surrounding the inner area and inside the vehicle, and the other one of which is an area surrounding the inner area and outside the vehicle; and a count determination unit configured to count the number of persons who move from one outer area to the other outer area through the inner area while a door of the platform is opened, configured not to count the number of persons while the door is closed, and configured to perform processing of determining, as a person to be counted, a person existing in the inner area at a time when the opened door is closed or the closed door is opened.

With the above configuration, it is possible to discriminate between a getting-on passenger and a getting-off passenger. That is, a person who moves from an outer area outside the vehicle to an outer area inside the vehicle through the inner area is regarded as the getting-on passenger, and a person who moves from the outer area inside the vehicle to outer area outside the vehicle through the inner area is regarded as the getting-off passenger. The discrimination between the getting-on passenger and getting-off passenger can be made irrespective of whether an entrance and an exit are integrated in one or separated. Thus, the person who gets off the vehicle from the entrance or a person who gets on the vehicle from the exit can also be counted on the basis of a getting-on/off direction. Further, by setting the inner area, it is possible to prevent multiple counting which may occur due to walking around the platform or movement of a person's body in an anteroposterior direction due to swaying movement of the vehicle.

Further, the count determination unit does not count the number of persons while the door is closed, so that even when a person moves around the platform while the door is closed, he or she is not erroneously counted.

Further, the count determination unit determines, as a person to be counted, a person existing in the inner area at a time when the door is closed or opened. Even when a person stays around the platform at a time when the opened door is closed or the closed door is opened, (specifically, in a case where the opened door is closed when a person who has got on the bus cannot move inside the vehicle due to congestion), he or she can be counted in the number of getting-on passengers. Further, in a case where a person staying around the platform gets off the vehicle from the platform when the closed door is opened, he or she can be counted in the number of getting-off passengers.

Preferably, the count determination unit counts, as the number of getting-on passengers, the number of persons who move from the outer area outside the vehicle to the outer area inside the vehicle through the inner area while the door is opened and further counts, as the number of getting-on passengers, the number of persons who move from the outer area outside the vehicle to the inner area among the persons who stay in the inner area at a time when the opened door is closed.

With this configuration, a person who gets on the vehicle when the door is opened and stays around the platform even after the opened door is closed can be counted in the number of getting-on passengers. Further, it is possible to prevent a person who has stayed around the platform from being counted again.

Preferably, the count determination unit counts, as the number of getting-off passengers, the number of persons who move from the outer area inside the vehicle to the outer area outside the vehicle through the inner area while the door is opened and further counts, as the number of getting-off passengers, the number of persons who move from the inner area to the outer area outside the vehicle among the persons who stay in the inner area at a time when the closed door is opened.

Since the count processing is not performed while the door is closed, it can be considered that a condition of the movement path from the outer area inside the vehicle through the inner area to the outer area outside the vehicle is not satisfied for a getting-off passenger who walks around the platform and gets off the vehicle when the door is opened. For example, at night, the vehicle runs with illumination for illuminating the platform turned off, so that even when a person to get off the vehicle comes close to the door, he or she cannot be recognized. Then, when the person recognized at a time when the illumination is turned on and the door of the platform is opened exists in the inner area, the above condition is not satisfied.

Thus, in the above configuration, the persons who move from the inner area to the outer area outside the vehicle among the persons who stay in the inner area at a time when the closed door is opened are counted in the number of getting-off passengers, so that even a person who has not passed through the inside of the vehicle immediately before he or she stays around the platform and thereafter gets off the vehicle when the door is opened can be counted in the number of getting-off passengers.

The passenger counter may further include a door state recognition unit configured to recognize a state of the door through a door open/close operation signal for opening/closing the door, a door open/close detection signal for directly detecting an open/close state of the door, or image recognition of a motion of the door on the captured image.

With this configuration, it is possible to reliably recognize a state of the door (door open state, door close state, at a time when the opened door is closed, and at a time when the closed door is opened, and so on). In particular, the passenger counter of the present invention is provided with the imaging section for person recognition, so that when a motion of the door is recognized on the captured image, it is possible to omit a special configuration for obtaining an external signal to recognize the state of the door, thereby eliminating the need for wiring and connection work for taking in the external signal.

Preferably, the passenger counter further includes: a person recognition unit configured to recognize a person on the captured image by identifying the person with a unique point; and a tracking unit configured to track the unique point to track the person on the captured image, wherein the setting unit sets the inner area in a range including the unique point of the person on a passage of the platform inside the vehicle.

With this configuration, it is possible to reliably recognize a person staying around the platform.

According to the present invention, even in a situation where a person stays around the platform, the number of passengers can be accurately counted for each location, such as a station.

BRIEF DESCRIPTION OF THE DRAWINGS

FIG. 4 is an explanatory view of data content stored in person area position data section;

DETAILED DESCRIPTION OF THE PREFERRED EMBODIMENT

Hereinafter, an embodiment of the present invention will be described with reference to the drawings.

Although the present embodiment is applied to a bus, the present invention is not limited to this, but can be equally applicable to various vehicles, such as a train or an elevator, having an opening/closing door at a platform or an entrance.

Figure 1:
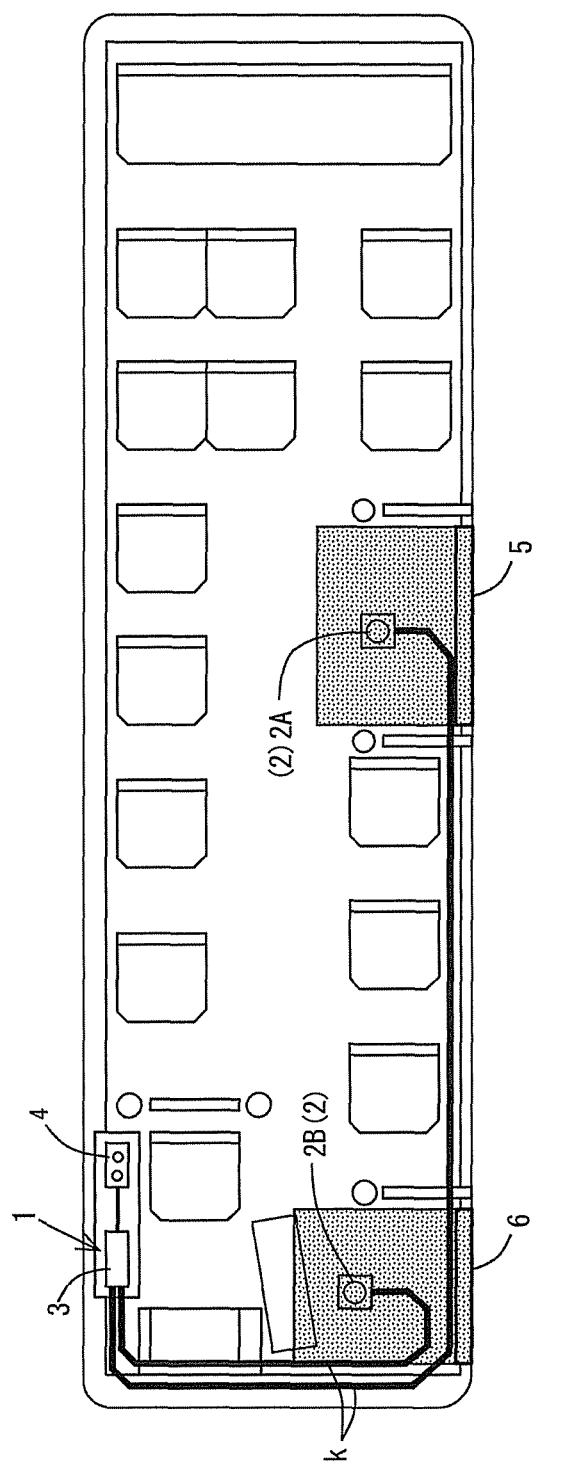
FIG. 1 is a schematic view of an inside of a bus in which a passenger counter according to an embodiment of the present invention is installed.

As illustrated in FIG. 1, a passenger counter 1 of the embodiment is provided in a bus and includes an imaging section 2 and a processing section 3.

The imaging section 2 is composed of a CCD camera or the like. The imaging section 2 is communicably connected to the processing section 3 by a communication cable, and the like. Imaging data corresponding to an image captured by the imaging section 2 is transmitted to the processing section 3. The imaging section 2 may be communicably connected to the processing section 3 by wireless. In the present embodiment, an entrance 5 and an exit 6 are located at a front side and a rear side of the bus, respectively, as the platform, and the imaging section 2 is provided at both the entrance 5 and exit 6. An imaging section 2A provided at the entrance 5 is composed of a single CCD camera or the like, installed at a ceiling around the entrance 5, and captures an area including the entrance 5 from the upper portion. The imaging section 2A is installed such that the entire lower end portion of a door of the entrance 5 appears in a captured image, including a passage floor around the entrance 5 and an area outside the bus through the door (see FIG. 3). An imaging section 2B at the exit 6 is installed in the same manner as the imaging section 2A at the entrance 5.

Figure 2:
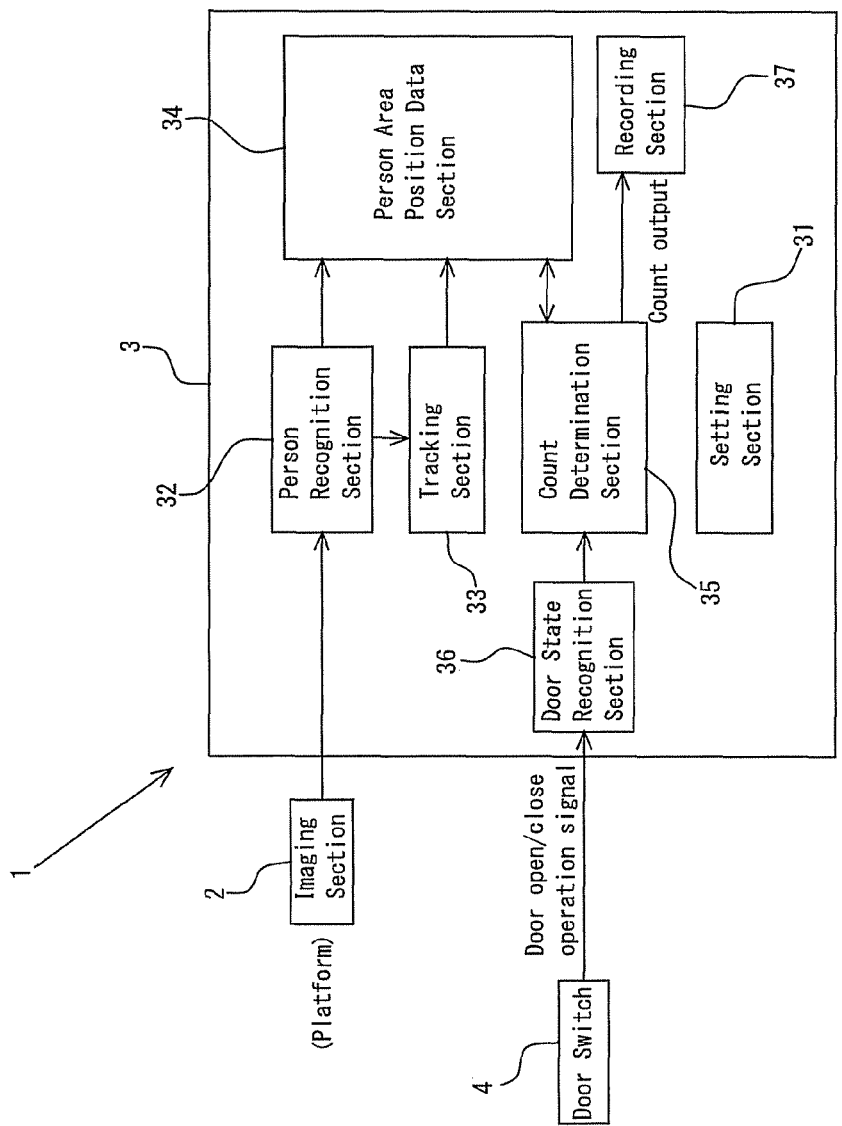
FIG. 2 is a block diagram illustrating a configuration of the passenger counter according to the embodiment.

The processing section 3 is provided beside a driver seat and is composed of a computer or the like having software and a memory. As illustrated in FIG. 2, the processing section 3 includes a setting section 31, a person recognition section 32, a tracking section 33, a person area position data section 34, a count determination section 35, a door state recognition section 36, and a recording section 37.

Figure 3:
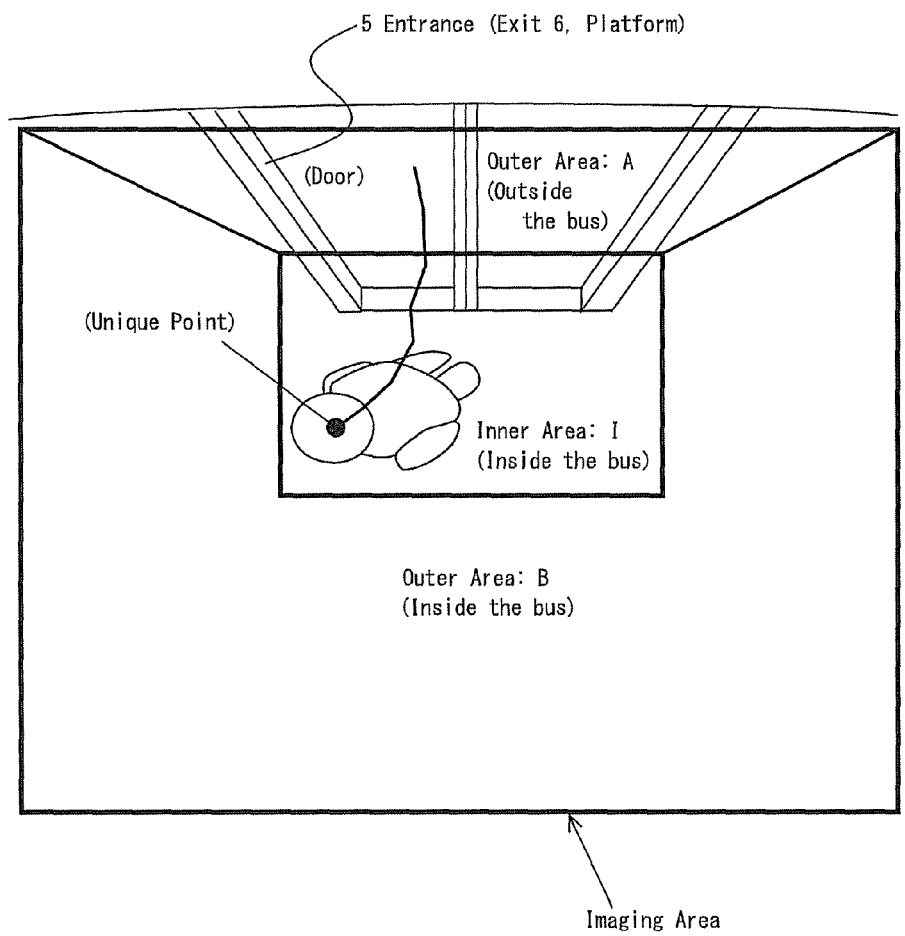
FIG. 3 is a schematic view illustrating an inner area and an outer area on a captured image.

The setting section 31 sets an inner area I and outer areas A, B so as to count a person appearing on the captured image. The inner area I and outer areas A, B are each a frame for capturing a moving position of a person at the platform (including a case where the platform is divided into an entrance and an exit). A shape and a size of each of the inner area I and outer areas A, B can be set according to conditions around the platform on the captured image. For example, as illustrated in FIG. 3, on the captured image of the entrance 5 or exit 6, the inner area I is set through the setting section 31 as a rectangular range surrounding a position corresponding to a passage inside the bus including the platform, and the outer areas A and B are set as a rectangular range surrounding the inner area I, wherein the outer area A corresponds to an area outside the bus, and outer area B corresponds to an area inside the bus. An area surrounded by an outer frame of the outer areas A and B may correspond to an imaging area (image capturing area) of the imaging section 2. Further, the inner area I is set so as to include a unique point of a person existing at a portion near the entrance 5 or exit 6 inside the bus, the unique point being indicated by the person recognition section 32 to be described later. This allows a person staying on a floor inside the entrance 5 or exit 6 in the inner area I to be reliably recognized. The setting section 31 is operated through, e.g., a not illustrated operation terminal device connected to the processing section 3. In this case, the captured image of the entrance 5 or exit 6 is displayed on a display section of the operation terminal device, and an operator operates an input section such as a mouse or a keyboard while viewing the captured image displayed on the display section to thereby set the inner area I and outer areas A, B through the setting section 31.

The person recognition section 32 receives imaging data (captured image of the entrance 5 or exit 6) from the imaging section 2 and recognizes a person on the captured image corresponding to the imaging data. The person recognition can be carried out by various image processing methods, preferably, by an object image recognition method described in JP 3390426, JP 3406577, or JP 3406587. Roughly speaking, the object image recognition method performs person recognition as follows. That is, the method executes fundamental wave Fourier transform in a circular shape centering on each pixel point on the captured image to recognize an contour part of a moving person image which is a borderline between the person image and a background image and identifies, on the basis of the contour part, the person image with a unique point. According to the object image recognition method, it is possible to reliably recognize a person from the captured image obtained by a single camera and to perform image processing with a smaller amount of processing data and at a higher processing speed than in a differential imaging method.

The tracking section 33 recognizes a position of the unique point of each person recognized by the person recognition section 32 to track the person appearing on the captured image.

The person area position data section 34 issues a unique person ID for each person who is newly recognized by the person recognition section 32 on the captured image from the imaging section 2 and tracked by the tracking section 33 and creates area position data that records areas (area values of the inner area I and outer areas A, B inside and outside the bus) over which the recognized person moves. As illustrated in FIG. 4, the person ID is set as, e.g., a unique numerical value (see "sample value" in FIG. 4). The area position data includes data corresponding to an area (current area position T0) including a current position of a target person, data corresponding to an area (most recent area position T1) including a position immediately before the current position, and data corresponding to an area (past area position T2) including a position before the most recent are position T1. In each of the data (T0, T1, and T2), area values (for example, A, I, B, etc., indicated as a "sample value" of FIG. 4) corresponding respectively to the inner area I, outer area A outside the bus, and outer area B inside the bus are recorded as a trace of the person who moves among the areas I, A, and B outside the bus.

The door state recognition section 36 receives an open/close signal of the door of each of the entrance 5 and exit 6, recognizes an open/close state of the door of each of the entrance 5 and exit 6, and inputs the recognized state to the count determination section 35. The open/close state of the door includes a state (door open state) where the door is fully opened and a state (door close state) where the door is fully closed, as well as, a time point when the opened door is fully closed, and a time point when the closed door is fully opened. As the open/close signal of the door, an external signal such as a door open/close operation signal to be generated by a door switch 4 (see FIG. 1) operated by a driver or a conductor of the bus or a door open/close detection signal of a sensor provided at an installation position of the door is used. In place of using the above external signal (operation signal, detection signal), the door state recognition section 36 may recognize the door open/close state by recognizing a motion of the door on the image captured by the imaging section 2. This makes it possible to omit the configuration for obtaining the external signal, thereby eliminating the need for wiring and connection work for taking in the external signal.

The count determination section 35 exchanges data with the person area position data section 34 and acquires the area position data of individual persons appearing on the captured image, while acquiring the open/close information of the door of entrance 5 and/or door of the exit 6, from the door state recognition section 36. On the basis of the above area position data and door open/close information, the count determination section 35 performs count processing of the number of passengers who get on the bus and/or the number of passengers who get off the bus. The count determination section 35 counts the number of persons who move from one outer area (A or B) to another outer area (A or B) through the inner area I during the door open state of the entrance 5 or exit 6, while not performing the count processing during the door close state. That is, at the entrance 5, while the door of the entrance 5 is opened, when it is recognized on the captured image of the entrance 5 that a person moves from the outer area A outside the bus to outer area B inside the bus through the inner area I, the count determination section 35 determines that the person has got on the bus and then performs the count processing to add 1 to the number of getting-on passengers; on the other hand, while the door of the entrance 5 is closed, even when there exists a person who moves among the outer areas A, B and inner area I, the count determination section 35 does not perform the count processing. Similarly, at the exit 6, while the door of the exit 6 is opened, when it is recognized on the captured image of the exit 6 that a person moves from the outer area B inside the bus to outer area A outside the bus through the inner area I, the count determination section 35 determines that the person has got off the bus and then performs the count processing to add 1 to the number of getting-off passengers; on the other hand, while the door of the exit 6 is closed, even when there exists a person who moves among the outer areas A, B and inner area I, the count determination section 35 does not perform the count processing. As described above, the count determination section 35 does not perform the count processing during the door close state, so that even when a person moves around the entrance 5 or exit 6 while the door of the entrance 5 or exit 6 is closed, he or she is not erroneously counted in the number of getting-on or getting-off passengers.

Further, the count determination section 35 performs processing of determining a person existing in the inner area I at a time when the opened door is closed or the closed door is opened as a passenger to be counted. That is, at the entrance 5, a person staying in the inner area I on the captured image of the entrance 5 at a time when the opened door of the entrance 5 is closed is regarded as being moved to the outer area B inside the bus, and thus, he or she is regarded as being moved from the outer area A outside the bus to outer area B inside the bus through the inner area I and is counted in the number of getting-on passengers. Thus, even when a person stays around the entrance 5 due to congestion, he or she can be counted in the number of getting-on passengers. At the exit 6, a person staying in the inner area I on the captured image of the exit 6 at a time when the closed door of the exit 6 is opened is regarded as being moved from the outer area B inside the bus. Thus, when the person staying in the inner area I is moved to the exit 6 and gets off the bus, he or she is regarded as being moved from the outer area B inside the bus to outer area A outside the bus through the inner area I and is counted in the number of getting-off passengers. Thus, even when a person stays around the exit 6 while the door of the exit 6 is closed and count processing is not performed, he or she can be counted in the number of getting-off passengers. The counted person may be marked with a mark indicating "counted" to avoid the same person from being counted multiple times while he or she appears on the captured image. As described above, a person who actually gets on or off the bus but stays around the entrance 5 or exit 6 is also counted in the number of getting-on or getting-off passengers, so that it is possible to accurately count the number of passengers for each bus stop at which the door is opened/closed and for each getting-on or getting-off time.

The recording section 37 is composed of a storage unit such as an internal memory or an external memory and records therein the number of getting-on passengers and number of getting-off passengers counted by the count determination section 35. The recording section 37 can record therein the number of getting-on passengers and number of getting-off passengers every time the door is opened/closed and for each bus stop (station) or bust stop number (station number) together with getting-on/off time, travel distance, and the like.

The following describes operation of the passenger counter 1.

In the passenger counter 1, an initial setting is performed by the setting section 31 to previously set the inner area I, outer area B inside the bus, and outer area A outside the bus on the captured image monitored by the imaging section 2.

First, the count processing to be performed at the entrance 5 will be described.

Figure 5:
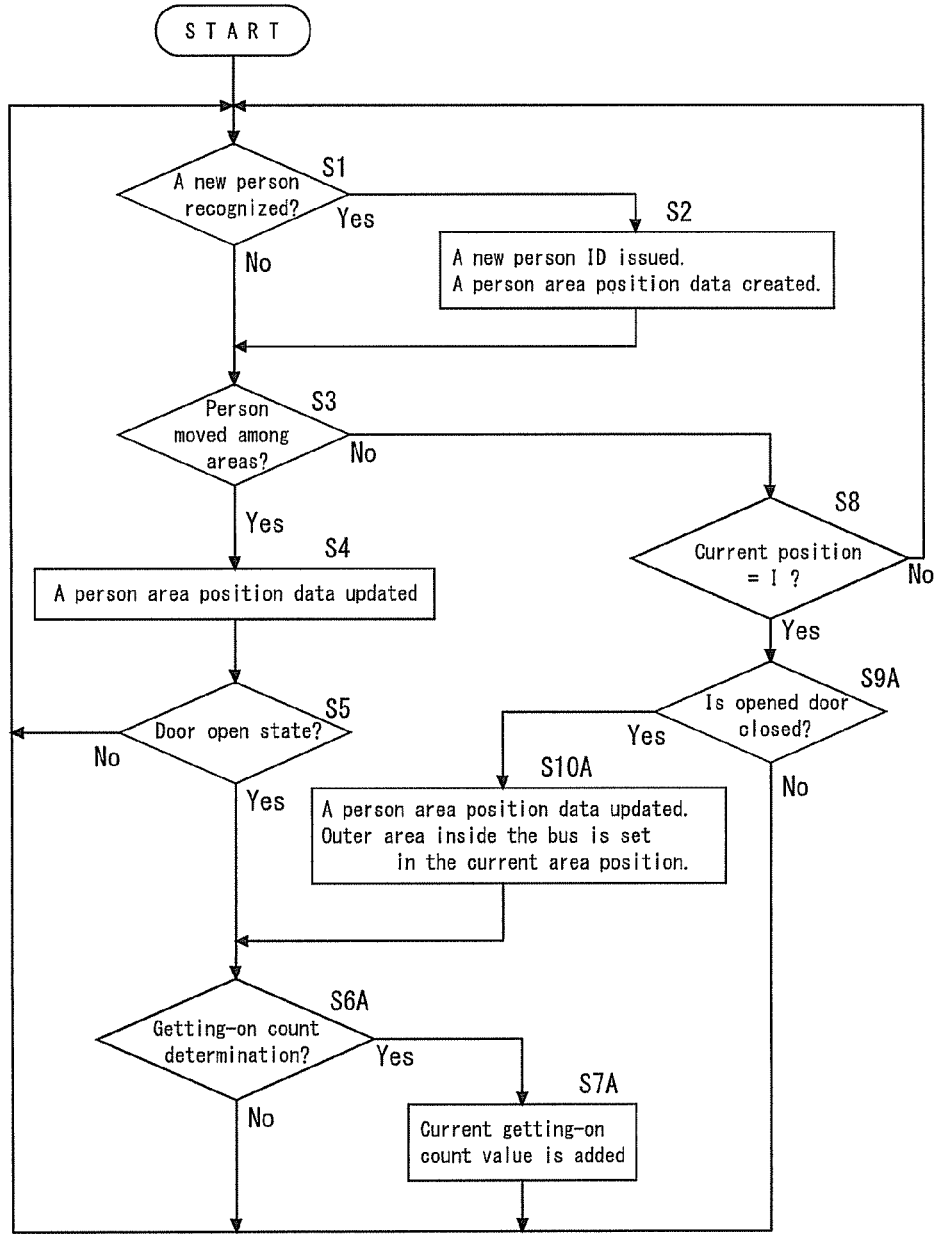
FIG. 5 is a flowchart for performing count processing at an entrance.

As illustrated in FIG. 5, when operation of counting the number of passengers is started, it is determined whether a new person appears on the image captured by the imaging section 2. When a new person appears on the captured image (S1), an unique person ID is issued for him or her, and the area position data associated with the person ID is newly created (S2). The area position data is constituted by the current area position T0, most recent area position T1, and past area position T2, and in each of the data, area values corresponding respectively to the inner area I, outer area A inside the bus, and outer area B outside the bus are recorded as a trace of the person who moves on the captured image.

Then, presence/absence of a person who moves among the outer areas A, B and inner area I on the captured image is detected (S3), and the area position data of the person who moves among the areas A, B, and I is updated (S4). The area position data is updated such that the most recent area position T1 is shifted to the past area position T2, the current area position T0 is to the most recent area position T1, and a current area value is recorded in the current area position T0.

Then, when the entrance 5 is in the open state, getting-on count determination is performed for the person whose area position data has been updated; on the other hand, when the entrance 5 is in the door close state, the getting-on count determination is not performed, and the processing flow is returned to step S1 (S5). The getting-on count determination is made based on whether or not the area position data of the person coincide with the area values corresponding to a getting-on direction (S6A). That is, when recorded data of the past area position T2, most recent area position T1, and current area position T0 of a person coincide respectably with A (outer area A outside the bus), I (inner area I), and B (outer area B inside the bus), he or she is determined to be a getting-on passenger. After being determined to be the getting-on passenger, the person is counted in the number of getting-on passengers, and a current count value is output (S7A) for storage in the memory. When the area position data of the person do not coincide with the area values corresponding to the getting-on direction, the processing flow is returned to step S1 ("No" in step S6A).

On the other hand, for the person determined not to move among the areas A, B, and I in step S3, it is determined whether or not the current area position T0 of the area position data indicates the inner area I (S8). When the current area position T0 does not indicate the inner area I, the processing flow is returned to step S1. The person whose current area position T0 indicates the inner area I is a person staying around the entrance 5 in the bus, and the area position data of him or her is edited (S10A) when the opened door is closed ("Yes" in S9A). The area position data is edited such that the most recent area position T1 is shifted to past area position T2, the current area position T0 is to most recent area position T1, and the area value indicating the outer area B inside the bus is written in the current area position T0. Thus, when the person staying at a portion around the entrance 5 inside the bus at a time when the opened door is closed is a person who gets on the bus when the door is opened, the area position data of him or her is such that the recorded data of the past area position T2, most recent area position T1, and current area position T0 indicate A (outer area A outside the bus), I (inner area I), and B (outer area B inside the bus), respectively. Then, the getting-on count determination is performed for the person whose area position data has thus been edited (S6A), and he or she is counted in the number of getting-on passengers, and a current count value is output (S7A) for storage in the memory. When the door has not yet been closed in step S9A, the area position data is not edited, and the processing flow is returned to step S1 ("No" in step S9A).

Next, the count processing to be performed at the exit 6 will be described.

Figure 6:
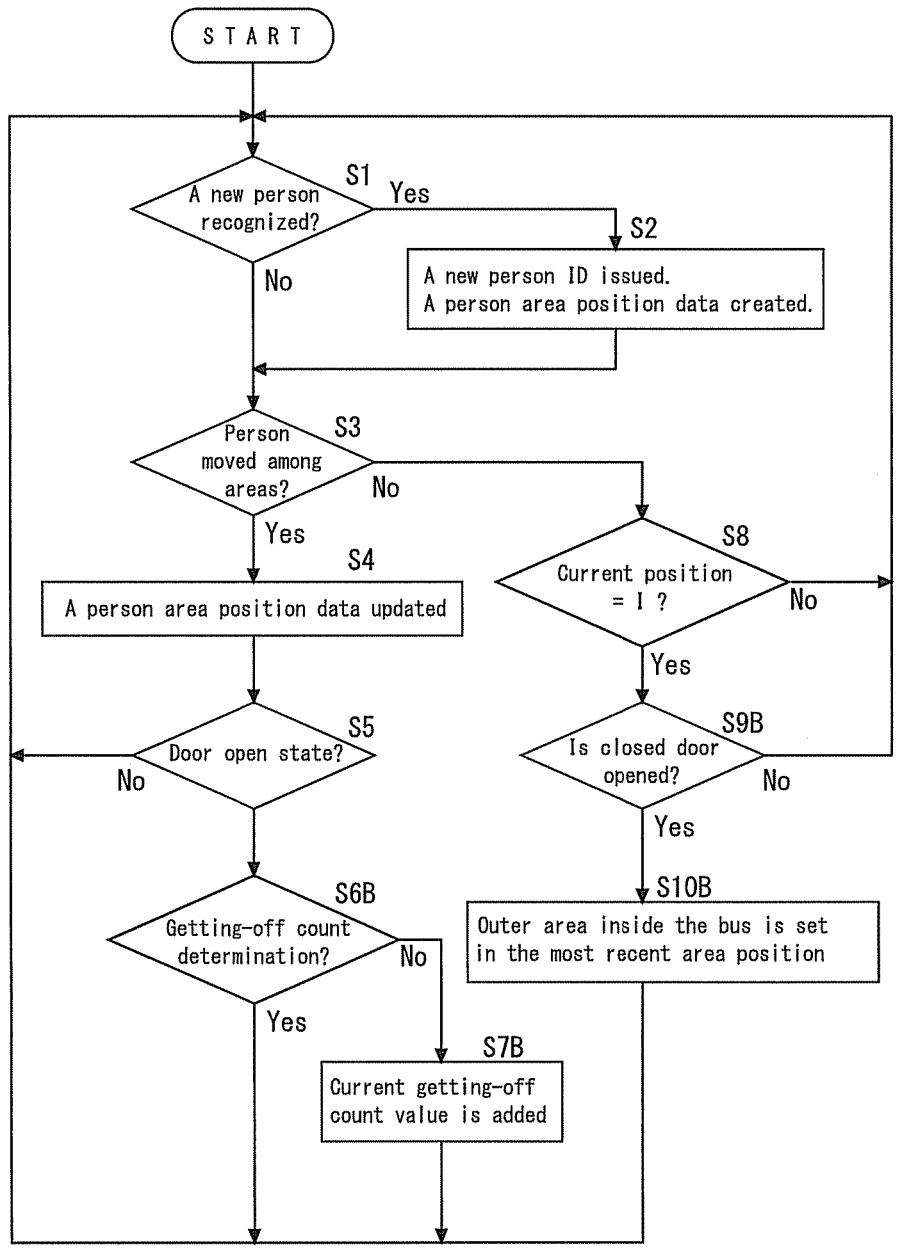
FIG. 6 is a flowchart for performing count processing at an exit.

As illustrated in FIG. 6, the count processing to be performed at the exit 6 differs from the count processing at the entrance 5 illustrated in FIG. 5 in that getting-off count determination is performed when the exit 6 is in the door open state (S6B, S7B) and processing for the person staying at a portion around the exit 6 inside the bus is performed (S9B, S10B).

In the getting-off count determination (S6B), when the recorded data of the past area position T2, most recent area position T1, and current area position T0 of a target person coincide respectably with B (outer area B inside the bus), I (inner area I), and A (outer area A outside the bus), he or she is determined to be a getting-off passenger. After being determined to be the getting-off passenger, the person is counted in the number of getting-off passengers, and a current count value is output (S7B) for storage in the memory.

For the person staying around the exit 6, the area position data of him or her is edited (S10B) at a time when the closed door is opened ("Yes" in S9B). The area position data is edited such that the area value indicating the outer area B inside the bus is written in the most recent area position T1. Thus, when the person staying around the exit 6 at a time when the closed door is opened is a person who has stayed at a portion around the exit 6 inside the bus since the door close state where the count processing is not performed, the area position data of him or her is such that the recorded data of the past area position T2, most recent area position T1, and current area position T0 indicate none (initial value), B (outer area B inside the bus), and I (inner area I), respectively. Then, the processing flow is returned to step S1.

Then, when the exit 6 is opened, and the person staying around the exit 6 moves to the exit 6, the movement among the areas A, B, and I is detected, and the area position data is edited such that the recorded data of the past area position T2, most recent area position T1, current area position T0 are updated to B (outer area B inside the bus), I (inner area I), and A (outer area A outside the bus) (S4). Thus, even when the person who has already stayed at a portion around the exit 6 inside the bus at a time when the door is opened gets off the bus, he or she is determined to be the getting-off passenger by the above-described getting-off count determination (S6B) and counted in the number of the getting-off passengers (S7B).

Next, a case where the entrance 5 and exit 6 are integrated in one will be described. In this case, unlike of FIG. 1, the imaging section 2 is provided only at the one platform.

Figure 7:
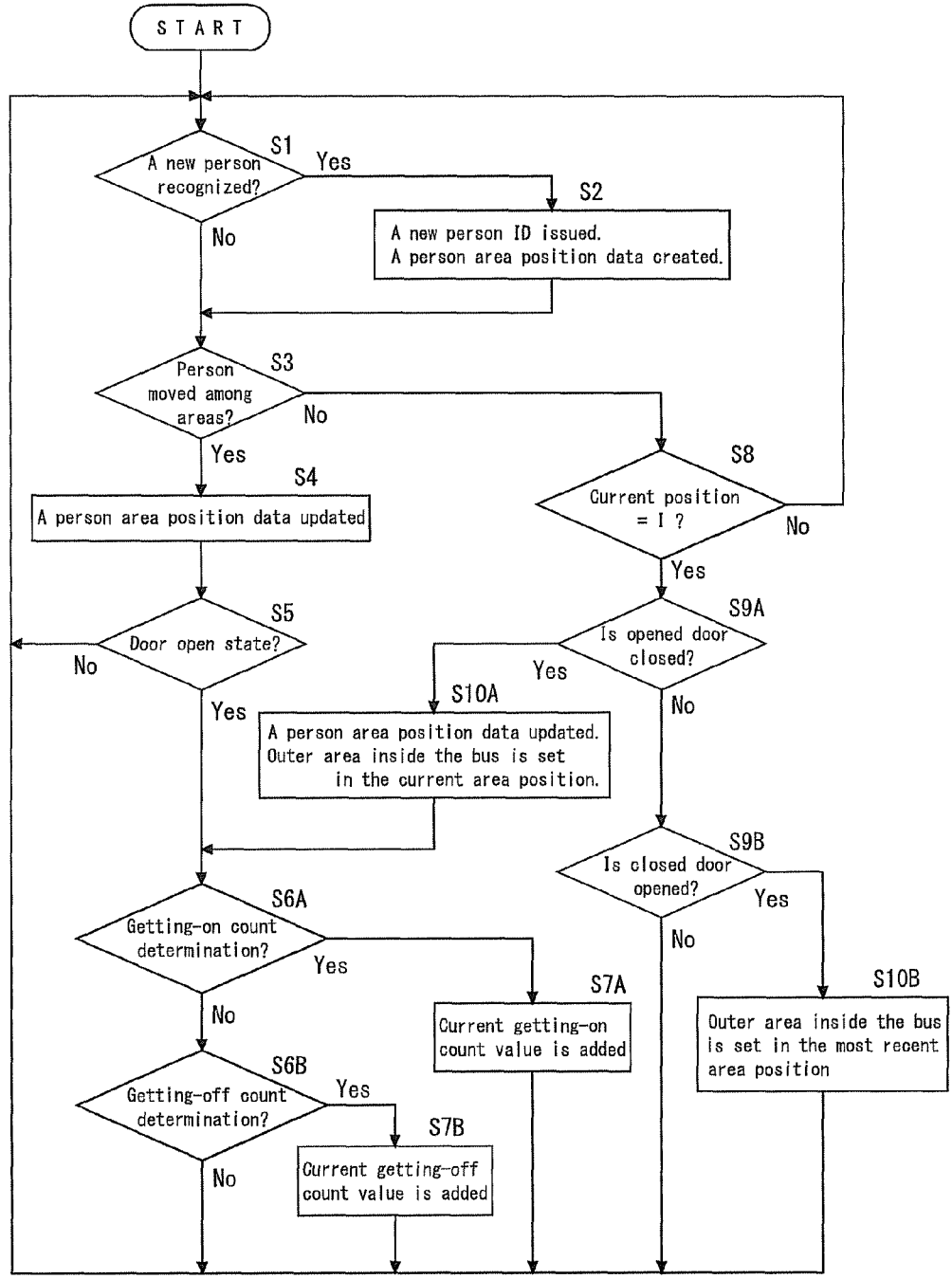
FIG. 7 is a flowchart for performing count processing at a platform.

In this case, the getting-on count processing flow of FIG. 5 and getting-off count processing flow of FIG. 6 are combined. That is, as illustrated in FIG. 7, when the platform is in the door open state, the getting-on count determination (S6A) and getting-off count determination (S6B) are sequentially performed, irrespective of the order of which processing is processed first.

For the person staying at a portion around the platform inside the bus, editing of the area position data (S9A, S10A) at a time when the opened door is closed and editing of the area position data (S9B, S10B) at a time when the closed door is opened are performed, irrespective of the order of which processing is processed first. However, after the editing of the area position data (S10A) at a time when the opened door is closed is performed, the getting-on count determination (S6A) is performed.

When a person who has got on the bus from outside the bus stays at a portion around the platform inside the bus, the door is then inevitably closed, so that a situation in which the closed door is opened cannot occur for him or her. Thus, in the area position data of the person who stays at a portion around the platform inside the bus after getting on the bus, the processing (S9B, S10B) of writing the area value indicating the outer area B inside the bus in the most recent area position T1, which is to be performed at a time when the closed door is opened, is not performed. This prevents the person staying at a portion around the platform inside the bus after getting on the bus from being excluded from the count or from being erroneously counted in the number of getting-off passengers.

As described above, according to the passenger counter 1 of the present embodiment, the person staying around the entrance 5 or exit 6 after actually getting on the bus is properly counted in the number of passengers, so that it is possible to accurately count the number of passengers for each bus stop at which the door is opened/closed and for each getting-on or getting-off time.

Further, in the passenger counter 1 according to the present embodiment, the area position data is updated when the movement among the areas A, B, and I is detected, and the getting-on/getting off count determination is performed based on the order of the data contents of the area position data, thereby preventing error count or preventing the same person from being counted multiple times.

Further, even when the bus runs at night, where illumination for illuminating the platform is turned on in the door open state and turned off in the door close state, the number of getting-off passengers can be counted properly. That is, when the illumination for illuminating the platform is turned off in the bus running at night, a person recognized on the captured image becomes invisible, and the recognition and tracking processing are stopped. Then, when the door of the exit 6 is opened upon arrival of the bus at a bus stop, the illumination is turned on, and a person is recognized on the captured image. At this time, even when a getting-off passenger has been already in the inner area I, outer area B inside the bus is written (S9B, S10B in FIG. 6 or 7) in the most recent area position T1 of the area position data of him or her as described above. Then, when this person actually gets off the bus, he or she is counted in the number of getting-off passengers without fail (S6B, S7B in FIG. 6 or 7). Thus, the passenger counter 1 according to the present embodiment can accurately count the number of getting-off passengers of the bus at night.

The invention claimed is:

1. A passenger counter that counts the number of persons who get on/off a vehicle, comprising:
an imaging unit installed at an inside of the vehicle, capturing a platform of the vehicle from upper portion to obtain a captured image, and recognizing/tracking a person appearing on the captured image;
a setting unit configured to set, on the captured image, an inner area which is an area corresponding to a passage inside the vehicle including the platform, and at least two outer areas, one of which is an area surrounding the inner area and inside the vehicle, and the other one of which is an area surrounding the inner area and outside the vehicle;
a count determination unit configured to count the number of persons who move from one outer area to the other outer area through the inner area while a door of the platform is opened, configured not to count the number of persons while the door is closed, and configured to perform processing of determining, as a person to be counted, a person existing in the inner area at a time when the opened door is closed; and
a person area position data section that issues a unique person ID for a person who is newly recognized on the captured image and newly creates area position data associated with the person ID as soon as the new person is recognized on the captured image,
the area position data including data indicative of a current area position (T0) that is a current position of the person on the captured image, data indicative of a most recent area position (T1) that is a position immediately before the current area position, and data indicative of a past area position (T2) that is a position before the most recent area position, and area values (I, A, and B) indicative of the inner area (I), the outer area (A) outside the vehicle, and the outer area (B) inside the vehicle being recorded in each of the data (T0, T1, and T2) as a trace of the person who moves among the inner area, the outer area outside the vehicle, and the outer area inside the vehicle,
the count determination unit determining that a person who moves among the outer areas and the inner area on the captured image is a getting-on passenger and adds the person to the number of getting-on passengers in a case where the recorded data of the past area position (T2), the most recent area position (T1), and the current area position (T0) of the area position data coincide with area values of the outer area (A) outside the vehicle, the inner area (I), and the outer area (B) inside the vehicle, respectively, while the platform door is opened, and the count determination unit editing the area position data of a person whose area value of the current area position (T0) is the inner area (I) at a time when the opened platform door is closed such that the area value of the most recent area position (T1) is shifted to the past area position (T2), the area value of the current area position (T0) is shifted to the most recent area position (T1), and the area value indicating the outer area (B) inside the vehicle is written in the current area position (T0).

2. The passenger counter according to any one of claim 1, further comprising a door state recognition unit configured to recognize a state of the door through a door open/close operation signal for opening/closing the door, a door open/close detection signal for directly detecting an open/close state of the door, or image recognition of a motion of the door on the captured image.

3. The passenger counter according to any one of claim 1, further comprising:
a person recognition unit configured to recognize a person on the captured image by identifying the person with a unique point; and
a tracking unit configured to track the unique point to track the person on the captured image, wherein
the setting unit sets the inner area in a range including the unique point of the person on a passage of the platform inside the vehicle.

4. A passenger counter that counts the number of persons who get on/off a vehicle, comprising:
an imaging unit installed at an inside of the vehicle, capturing a platform of the vehicle from upper portion to obtain a captured image, and recognizing/tracking a person appearing on the captured image;
a setting unit configured to set, on the captured image, an inner area which is an area corresponding to a passage inside the vehicle including the platform, and at least two outer areas, one of which is an area surrounding the inner area and inside the vehicle, and the other one of which is an area surrounding the inner area and outside the vehicle;
a count determination unit configured to count the number of persons who move from one outer area to the other outer area through the inner area while a door of the platform is opened, configured not to count the number of persons while the door is closed, and configured to perform processing of determining, as a person to be counted, a person existing in the inner area at a time when the closed door is opened; and a person area position data section that issues a unique person ID for a person who is newly recognized on the captured image and newly creates area position data associated with the person ID as soon as the new person is recognized on the captured image, the area position data including data indicative of a current area position (T0) that is a current position of the person on the captured image, data indicative of a most recent area position (T1) that is a position immediately before the current area position, and data indicative of a past area position (T2) that is a position before the most recent area position, and area values (I, A, and B) indicative of the inner area (I), the outer area (A) outside the vehicle, and the outer area (B) inside the vehicle being recorded in each of the data (T0, T1, and T2) as a trace of the person who moves among the inner area, the outer area outside the vehicle, and the outer area inside the vehicle, the count determination unit determining that a person who moves among the outer areas and the inner area on the captured image is a getting-off passenger and counts the person as one of getting-off passengers in a case where the recorded data of the past area position (T2), the most recent area position (T1), and the current area position (T0) of the area position data coincide with the area values of the outer area (B) inside the vehicle, the inner area (I), and the outer area (A) outside the vehicle, respectively, while the platform door is opened, and the count determination unit editing the area position data of a person whose area value of the current area position (T0) is the inner area (I) at a time when the closed platform door is opened such that the area value indicating the outer area (B) inside the vehicle is written in the most recent area position (T1).

5. The passenger counter according to any one of claim 4, further comprising a door state recognition unit configured to recognize a state of the door through a door open/close operation signal for opening/closing the door, a door open/close detection signal for directly detecting an open/close state of the door, or image recognition of a motion of the door on the captured image.

6. The passenger counter according to any one of claim 4, further comprising:
a person recognition unit configured to recognize a person on the captured image by identifying the person with a unique point; and
a tracking unit configured to track the unique point to track the person on the captured image, wherein
the setting unit sets the inner area in a range including the unique point of the person on a passage of the platform inside the vehicle.

* * * * *